(12) United States Patent
Francis

(10) Patent No.: US 8,290,785 B2
(45) Date of Patent: Oct. 16, 2012

(54) TICKET DISTRIBUTION SYSTEM

(76) Inventor: Mitchell J. Francis, Beverly Hills, CA (US)

( * ) Notice: Subject to any disclaimer, the term of this patent is extended or adjusted under 35 U.S.C. 154(b) by 2517 days.

(21) Appl. No.: 10/638,744

(22) Filed: Dec. 24, 2002

(65) Prior Publication Data

US 2004/0111303 A1 Jun. 10, 2004

Related U.S. Application Data

(60) Provisional application No. 60/426,383, filed on Nov. 15, 2002.

(51) Int. Cl.
*G06Q 10/00* (2006.01)
(52) U.S. Cl. .......................................... 705/1.1
(58) Field of Classification Search ................. 705/1, 35, 705/37, 1.1
See application file for complete search history.

(56) References Cited

U.S. PATENT DOCUMENTS

| | | | |
|---|---|---|---|
| 5,404,291 A | 4/1995 | Kerr et al. | |
| 5,408,417 A | 4/1995 | Wilder | |
| 5,459,306 A | 10/1995 | Stein et al. | |
| 5,797,126 A | 8/1998 | Helbling et al. | |
| 6,067,532 A | 5/2000 | Gebb | |
| 6,446,045 B1 | 9/2002 | Stone et al. | |
| 6,477,503 B1 | 11/2002 | Mankes | |
| 6,496,809 B1* | 12/2002 | Nakfoor | 705/80 |
| 6,507,823 B1 | 1/2003 | Nel | |
| 7,003,485 B1 | 2/2006 | Young | |
| 7,069,228 B1 | 6/2006 | Rose et al. | |
| 7,076,451 B1 | 7/2006 | Coupland et al. | |
| 2002/0046099 A1 | 4/2002 | Frengut et al. | |
| 2002/0082879 A1 | 6/2002 | Miller et al. | |
| 2002/0082969 A1* | 6/2002 | O'Keeffe et al. | 705/37 |
| 2002/0116343 A1 | 8/2002 | Nakamura et al. | |
| 2002/0156749 A1 | 10/2002 | Sardy | |
| 2004/0215517 A1 | 10/2004 | Chen et al. | |
| 2005/0220278 A1 | 10/2005 | Zirngibl et al. | |

FOREIGN PATENT DOCUMENTS

| | | |
|---|---|---|
| EP | 1098273 | 5/2001 |
| JP | 11-031186 | 2/1999 |
| WO | WO01/71669 | 9/2001 |

OTHER PUBLICATIONS

Shirley, D., The Future of the $480 Broadway Ticket, The Los Angeles Times, Dec. 14, 2001, p. F.2.
"San Franscisco Internet Company Helps Make Last-Minute Reservations . . .", San Jose Mercury News, Jul. 19, 2000.
United States Patent and Trademark Office—Board of Patent Appeals and Interferences, Decision on Appeal, U.S. Appl. No. 10/327,612, Jun. 17, 2010.
Waters, C.D., "Web Sites Vie to Bring 'Dynamic Pricing' to Restaurants", Nations' Restaurant News, Aug. 21, 2000, 34(34): 67-68.

* cited by examiner

*Primary Examiner* — Dennis Ruhl
(74) *Attorney, Agent, or Firm* — Welsh Flaxman & Gitler LLC

(57) ABSTRACT

A system is provided for facilitating the distribution of premium tickets to spectator events. The system includes a central distribution processor to which patrons are provided access for determining the availability of premium tickets and purchasing available premium tickets at a premium price. The system also includes a plurality of remote show box offices of distinct spectator events linked to the central distribution processor, the remote show box offices including interface software compatible with the central distribution processor for facilitating the uploading of relevant ticket information to the central distribution processor. The interface software further provides a user interface through which the plurality of remote show box offices selectively enter available premium ticket information which is subsequently uploaded to the central distribution processor for access and purchase by patrons.

8 Claims, 2 Drawing Sheets

TICKET DISTRIBUTION SYSTEM

CROSS-REFERENCE TO RELATED APPLICATIONS

This U.S. patent application is based upon U.S. Provisional Patent Application Ser. No. 60/426,383, filed Nov. 15, 2002, and entitled "Ticket Distribution System".

BACKGROUND OF THE INVENTION

1. Field of the Invention

The invention relates to a system for the distribution of premium tickets. More particularly, the invention relates to a system whereby producers of spectator events are able to reap a profit from the sale of premium tickets warranting the payment of a premium ticket price. To date, the only ones profiting from the sale of tickets at a premium price are ticket brokers and illegal ticket scalpers, both of whom profit from the effort of others.

2. Description of the Prior Art

For as long as people have sought out entertainment in the form of spectator events, people have competed to obtain the best tickets or, in the event of very popular events, any ticket at all. In most instances, these "premium tickets" are very difficult to obtain. Apart from standing in line, waiting on the telephone or sitting on the Internet for many hours (and hoping you are lucky enough to obtain premium tickets), the only certain way for obtaining premium tickets is either by knowing someone closely associated with the event or paying a substantial premium to a ticket broker.

In recent years ticket brokering or scalping has developed into a billion dollar a year business (and oftentimes illegal business). Ticket brokers generally obtain premium tickets by utilizing privilege and access to people responsible for the distribution of the tickets, purchasing tickets from people with privilege and access to premium tickets and/or paying people to wait in lines or on telephone systems utilized in selling the tickets to desirable spectator events.

The manner in which the ticket distribution business has developed prevents those people most closely associated with the production of the spectator events from making the full profit from the most desirable seats to these sought after spectator events (while ticket brokers do nothing to develop the event but make large sums by reselling premium tickets at an inflated price, which is illegal in some states). Producers of these spectator events limit themselves to the face value of the tickets which they sell, even if certain tickets might have a higher market value than other tickets. For example, event producers might be able to sell front row seats at a premium price despite the fact that the first ten rows of a spectator event are priced at the same level. However, doing this might be a detriment to customer relations and good will, and producers generally will not add a premium to certain tickets despite the potential for added revenues.

As such, those familiar with the production of spectator events and the distribution of tickets appreciate the need for a mechanism by which those most closely associated with the production of a spectator event may make a profit from the market value sale of premium tickets. The present invention provides such a system.

SUMMARY OF THE INVENTION

It is, therefore, an object of the present invention to provide a system for facilitating the distribution of premium tickets to spectator events. The system includes a central distribution processor to which patrons are provided access for determining the availability of premium tickets and purchasing available premium tickets at a premium price. The system also includes a plurality of remote show box offices of distinct spectator events linked to the central distribution processor, the remote show box offices including interface software compatible with the central distribution processor for facilitating the uploading of relevant ticket information to the central distribution processor. The interface software further provides a user interface through which the plurality of remote show box offices selectively enter available premium ticket information which is subsequently uploaded to the central distribution processor for access and purchase by patrons.

It is also an object of the present invention to provide a system wherein a producer of the spectator event and an operator of the present system split the premium price in a predetermined manner.

It is another object of the present invention to provide a system wherein an operator of the present system receives a commission based upon the sale of premium tickets.

It is a further object of the present invention to provide a system wherein the user interface includes a seating chart display through which a remote show box office employee enters premium ticket information.

It is yet a further object of the present invention to provide a system including a ticket information and sales site at which patrons may access the central distribution processor for purchasing premium tickets.

It is also an object of the present invention to provide a method for distributing premium tickets to spectator events. The method is achieved in the following manner: establishing a central distribution processor which stores information concerning the availability of premium tickets to spectator events which may be purchased at a premium price; installing interface software compatible with the central distribution processor at a plurality of remote show box offices, the interface software facilitating the uploading of relevant premium ticket information to the central distribution processor, entering available premium ticket information at the spectator event remote show box office via a user interface associated with the interface software, the user interface permitting the plurality of remote show box offices to selectively enter available premium ticket information for uploading to the central distribution processor, uploading the available premium ticket information to the central distribution processor, and providing patrons with access to the central distribution processor for determining the availability of premium tickets and purchasing available premium tickets.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
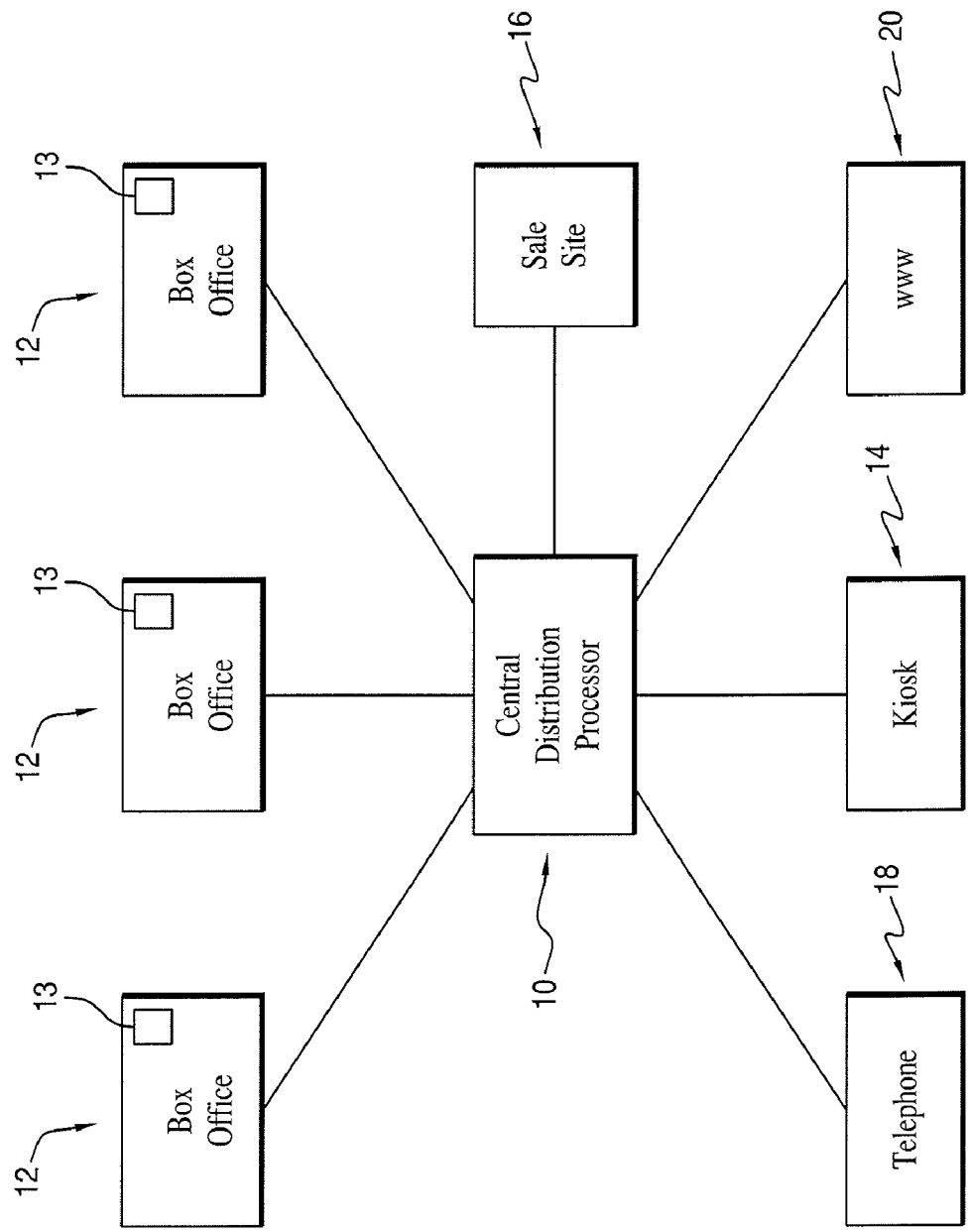
FIG. 1 is a schematic of the present system.

With reference to FIG. 1, a system is disclosed for facilitating the distribution of premium tickets such that producers of the spectator event may make a higher, or market value, profit from the sale of these premium tickets. In accordance with the present invention, the term "premium ticket(s)" is meant to refer to highly sought after tickets for which patrons are willing to pay a premium price. Such "premium tickets" include, but are not limited to, tickets for very popular spectator events (for example, a sold out concert or sporting event), tickets to events for which tickets may not be readily available to the public at large (for example, political fund raising events) and highly desirable seats to spectator events (for example, front row tickets to a theatrical show or box seats to the World Series).

Further, and in accordance with a preferred embodiment of the present invention, the "producers" of the spectator events for which tickets are sold using the present system are those people intimately responsible for the development and production of the spectator event. For example, producers of a concert may utilize the present system by releasing a select number of seats for sale in accordance with the present invention. Similarly, a sports franchise would utilize the present system by releasing premium seats for sale in accordance with the present system. Theater owners might also take advantage of the present system by releasing a certain number of seats for sale in accordance with the present invention. Generally, the present system is designed to allow "producers" of spectator events to profit from the market value of the "premium seats" in lieu of ticket brokers making a profit from the hard work put in by the producers of these spectator events.

In accordance with the present invention, the system interconnects a central distribution processor 10 with one or a plurality of remote show box offices 12 associated with the spectator event and controlled by producers of the spectator event, making premium tickets available to patrons at a market value price (for example, a ticket having a face value of $100 might be sold through the system at a market value price of $200).

More specifically, the system includes a central distribution processor 10 which monitors, maintains and provides access to information regarding the availability of premium tickets. In accordance with a preferred embodiment of the present invention, patrons are provided access to the information maintained in the central distribution processor 10 via a kiosk 14, or other patron interface 18, 20, at which patrons may browse available tickets and purchase seats to those spectator events they wish to see. The system further includes a plurality of remote show box offices 12 of distinct spectator events linked to the central distribution processor 10. The remote show box offices 12 include interface software 13 compatible with the central distribution processor 10 for facilitating the uploading of relevant ticket information to the central distribution processor 10. The interface software 13 further provides a user interface through which the plurality of remote show box offices 12 selectively enter available premium ticket information which is subsequently uploaded to the central distribution processor 10 for access and purchase by patrons.

In accordance with a preferred embodiment of the present invention, the central distribution processor 10 is maintained at, or in association with, a ticket information and sales site 16. The ticket information and sales site 16 provides patrons with a convenient location at which they may gather ticket information and/or purchase available premium tickets. The ticket information and sales site 16 is further provided with a plurality of computer terminals, operated by employees of the company operating the present system. It is further contemplated that patrons may obtain ticket and sales information, as well as purchase the tickets, via telephone 18 or a global communication network 20 (e.g., WWW). Although the communication systems described above are generally wire based, communication may be achieved via wireless systems as may be developed in the future.

The ticket information and sales site 16 is further provided with an information board upon which available premium tickets, and associated prices, are listed for convenient review by patrons in the vicinity of the ticket information and sales site 16. It is contemplated that the information board will take the form of a conventional electronic overhead display or video monitors.

Based upon a preferred set up for the ticket information and sales site 16, a patron is provided ready access to ascertain available premium tickets and purchase the same from a system employee. Premium ticket information is retrieved by either personally consulting with an employee operating a computer terminal directly linked to the central distribution processor 10 or merely reviewing the information presented on the information board positioned for easy access by patrons in the vicinity of the ticket information and sales site. In addition, and as briefly discussed above, premium ticket information may be obtained via telephone or via a global communication network such as the Internet.

In an effort to provide patrons with information regarding the various spectator events for which premium tickets are available, the ticket information and sales site 16 is further equipped with video monitors showing excerpts of the various spectator events for which tickets are available. Written literature regarding the various spectator events is also made available to patrons requiring information before deciding upon which event to see.

As mentioned above, the central distribution processor 10 is linked to a plurality of remote show box offices 12 of distinct spectator events. These show box offices 12 are contemplated as being under the control of the spectator event producers such that the producers have complete control of the premium tickets which are released and sold through the present system. Facilitating communication between the various spectator events participating in the present system and the central distribution processor 10 is an interface software 13 compatible with the central distribution processor 10. The interface software 13 is loaded at each of the remote show box offices 12 and permits these show box offices 12 to conveniently and reliably transmit premium ticket information to the central distribution processor 10 such that the premium tickets are immediately made available to patrons taking advantage of the present system.

In accordance with the preferred embodiment of the present invention, the interface software 13 directs employees of the remote show box office 12 on entering premium ticket information onto the computer system of the show box office in such a way that the interface software 13 loaded on the computer system of the show box office formats the premium ticket information for use by the central distribution processor 10. The show box office 12 computer system, through the use of the interface software 13, then transmits the formatted premium ticket information to the central distribution processor 10 such that it may be readily used by the central distribution processor 10. It is contemplated that the interface software 13 will include an interface screen 22. The interface screen 22 is provided with a seating diagram, or seating chart, of the venue at which the spectator event is being held. Associated with the seating diagram is pricing information for the premium seats of the spectator event.

Figure 2:
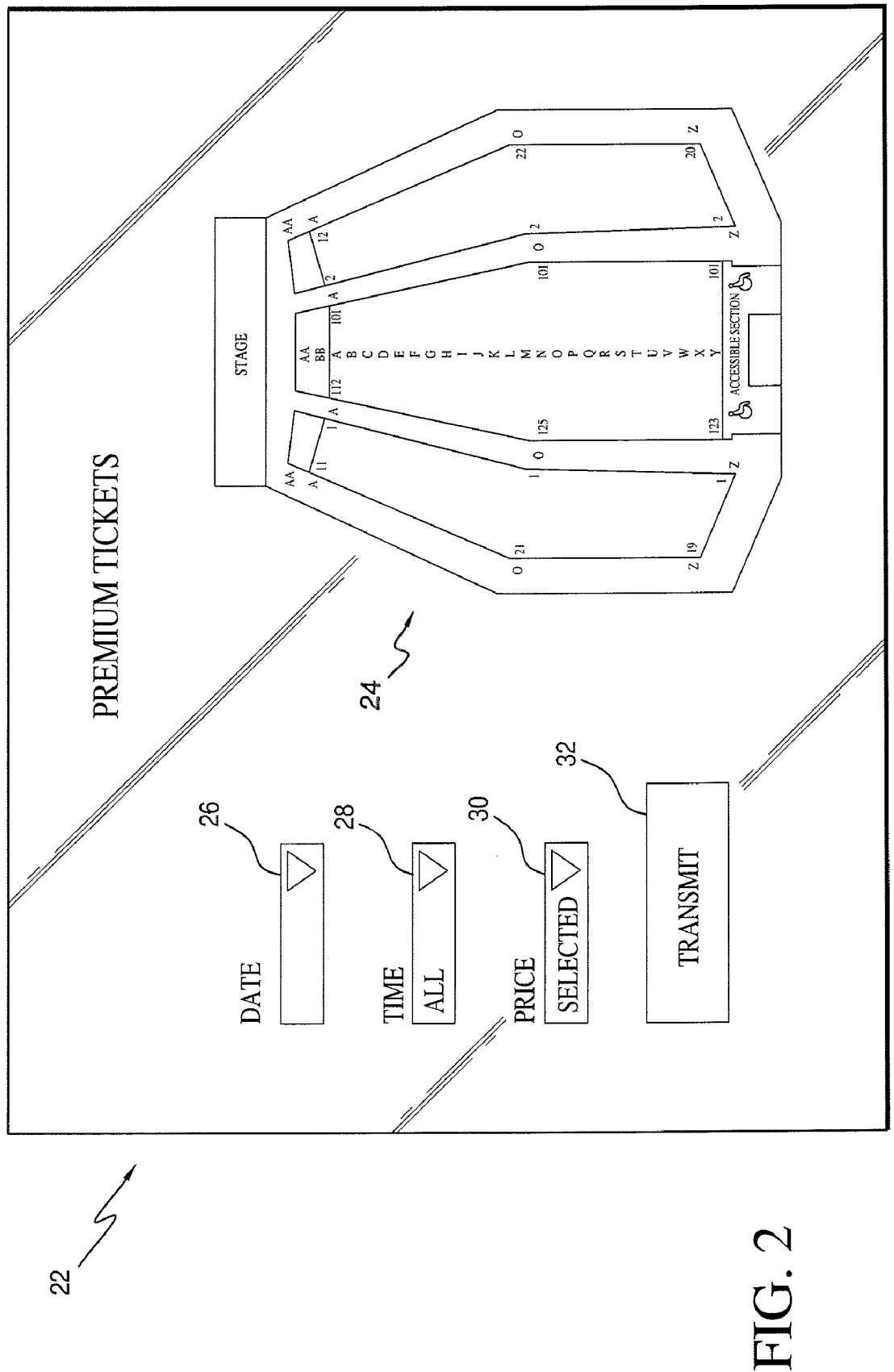
FIG. 2 is an exemplary interface screen in accordance with the present invention.

With a reference to FIG. 2, an interface screen 22 is disclosed which may be used in accordance with the present invention. The interface screen 22 includes an interactive seating chart 24 which may be actuated via a mouse to designate specific seats for sale. Pre-sold seats will either be not shown in the seating chart or colored differently from unsold seats so as to permit operators to readily determine those seats which may be selected in accordance with the present invention. The interface screen 22 also includes drop down menus for indicating the date of the event 26, the time of the event 28 and the price at which the seats should be sold 30. Once all selections are made, the selected information is transmitted to the central distribution processor by clicking on the transmit button 32.

In this way, the remote show box office employee need only pick a specific spectator event for which he or she wishes to designate premium tickets to be made available via the present system and click upon the specific premium seats shown on the seating diagram to designate those premium tickets the producer of the spectator event wishes to make available through the present system. Once the spectator event employee selects the designated premium seats, the interface software combines the selected seats with ticket cost information. The information is then formatted and transmitted to the central distribution processor 10. In accordance with a preferred embodiment of the present invention, it is contemplated that the ticket cost will be set at an amount previously agreed upon by the producer and the operator of the present system. While a preferred embodiment utilizes a computer network for transmitting information to the central distribution processor, it is contemplated that the information may be transmitted in other ways, for example, via facsimile, or other electronic communication mechanisms.

In accordance with an alternate embodiment for establishing a market value at which to sell premium tickets, tickets may be sold via an auction type arrangement wherein patrons will be able to bid upon tickets within a predefined time frame.

While a computer interface is disclosed in accordance with a preferred embodiment of the present invention, it is contemplated that producers may fax or otherwise transmit premium ticket information to the operator of the present system for inclusion in the central distribution processor 10. Where the information is faxed, telephoned or otherwise transmitted to the operator of the present system in a manually oriented manner, the premium ticket information will be manual input into the central distribution processor 10 by the operator of the present system.

It is contemplated that the premium ticket information will be made available to patrons on a daily basis with the premium ticket information being released at a predetermined time before the spectator event. However, since remote show box offices 12 have control over when to release premium tickets via the interface software 13, the remote show box offices 12 may choose to release premium tickets over a period of time if they find such a distribution technique enhances overall sales of tickets.

It should be understood that the present system links a plurality of distinct, unrelated spectator events through the application of the interface software described above. The present system, therefore, does not require that the distinct spectator events operate in a similar manner or that the distinct spectator events form a type of affiliation. Rather, the use of the present interface software 13 in conjunction with the central distribution processor 10 allows these distinct spectator events to operate independently, while permitting the producers of the spectator events to readily distribute premium tickets when it is determined additional profit may be made through the sale of these premium tickets.

For example, the remote show box office 12 may decide to release ten front row seats one week before the spectator event and later determine to release an additional ten front row seats two days before the spectator event. Decision making regarding when and how many tickets to release is enhanced by providing the interface software 13 with functionality permitting the remote show box office 12 to monitor sales of their released tickets at the ticket information and sales site 16. Specifically, the remote show box office 12 is provided with limited access to the central distribution processor 10, permitting retrieval of information concerning ticket sales via the present system. As such, if the remote show box office finds that the ten premium tickets released one week before the spectator event are going quickly, they may decide to release additional premium tickets to the central distribution processor 10, if such tickets are still available. The present system allows these remote show box offices 12 to conveniently, reliably and quickly release tickets to meet patrons' demand and ensure that the optimum profit is made for each of the tickets sold to the spectator event. Similarly, producers utilizing the present system will be provided access to the central distribution processor 10 allowing them to take back tickets they need, and which have not already been sold.

From a business perspective, it is contemplated that the producer of the spectator event and the operator of the present system will split the premium paid on the sale of the premium tickets. For example, where a 50/50 split is agreed upon and a premium ticket having a face value of $100 is sold for $200, the producer of the spectator event will receive $100 based upon the face value of the ticket and an additional $50 based upon the premium paid, while the operator of the present system will receive $50 based upon the premium paid. It is also contemplated that operators of the present system may generate income through a commission based system either in combination with a defined split arrangement or as a separate arrangement.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A method for distributing premium tickets to spectator events, the premium tickets being offered for sale at a market value price above a face value of the premium ticket providing producers of spectator events with an option to release a limited number of premium seats for sale to profit from market value of the released premium seats comprising, the following steps:

establishing a central distribution processor which stores information concerning the availability of premium tickets to spectator events which may be purchased at a premium price;

installing interface software compatible with the central distribution processor at a plurality of remote show box offices, the interface software facilitating the uploading of relevant premium ticket information to the central distribution processor, the interface software including an interface screen including an interactive seating chart and menus for indicating a date of the spectator event, a time of the spectator event and a price at which seats are to be sold, wherein the remote show box offices are controlled by producers of the spectator event;

entering available premium ticket information at the spectator event remote show box office via a user interface associated with the interface software, the user interface permitting the plurality of remote show box offices to selectively enter available premium ticket information for uploading to the central distribution processor;

uploading the available premium ticket information to the central distribution processor; and providing patrons with access to the central distribution processor for determining the availability of premium tickets and purchasing available premium tickets;

splitting a premium paid on the sale of the premium tickets is split between an operator of the present system and the producers of the spectator event.

2. The method according to claim 1, wherein an operator of the present system receives a commission based upon the sale of premium tickets.

3. The method according to claim 1, wherein the user interface includes a seating chart display through which a remote show box office employee enters premium ticket information.

4. The method according to claim 1, wherein patrons are provided access to the central distribution processor at a ticket information and sales site.

5. A system for facilitating the distribution of premium tickets to spectator events, the premium tickets being offered for sale at a market value price above a face value of the premium ticket providing producers of spectator events with an option to release a limited number of premium seats for sale to profit from market value of the released premium seats, comprising:

a central distribution processor to which patrons are provided access for determining the availability of premium tickets and purchasing available premium tickets at a premium price;

a plurality of remote show box offices of distinct spectator events linked to the central distribution processor, the remote show box offices including interface software compatible with the central distribution processor for facilitating the uploading of relevant ticket information to the central distribution processor, the interface software including an interface screen including an interactive seating chart and menus for indicating a date of the spectator event, a time of the spectator event and a price at which seats are to be sold, wherein the remote show box offices are controlled by producers of the spectator event; and wherein the interface software further provides a user interface through which the plurality of remote show box offices selectively enter available premium ticket information which is subsequently uploaded to the central distribution processor for access and purchase by patrons and a premium paid on the sale of the premium tickets is split between an operator of the present system and the producers of the spectator event.

6. The system according to claim 5, wherein an operator of the present system receives a commission based upon the sale of premium tickets.

7. The system according to claim 5, wherein the user interface includes a seating chart display through which a remote show box office employee enters premium ticket information.

8. The system according to claim 5, further including a ticket information and sales site at which patrons may access the central distribution processor for purchasing premium tickets.

* * * * *